Figures 1, 2, 3, 4:
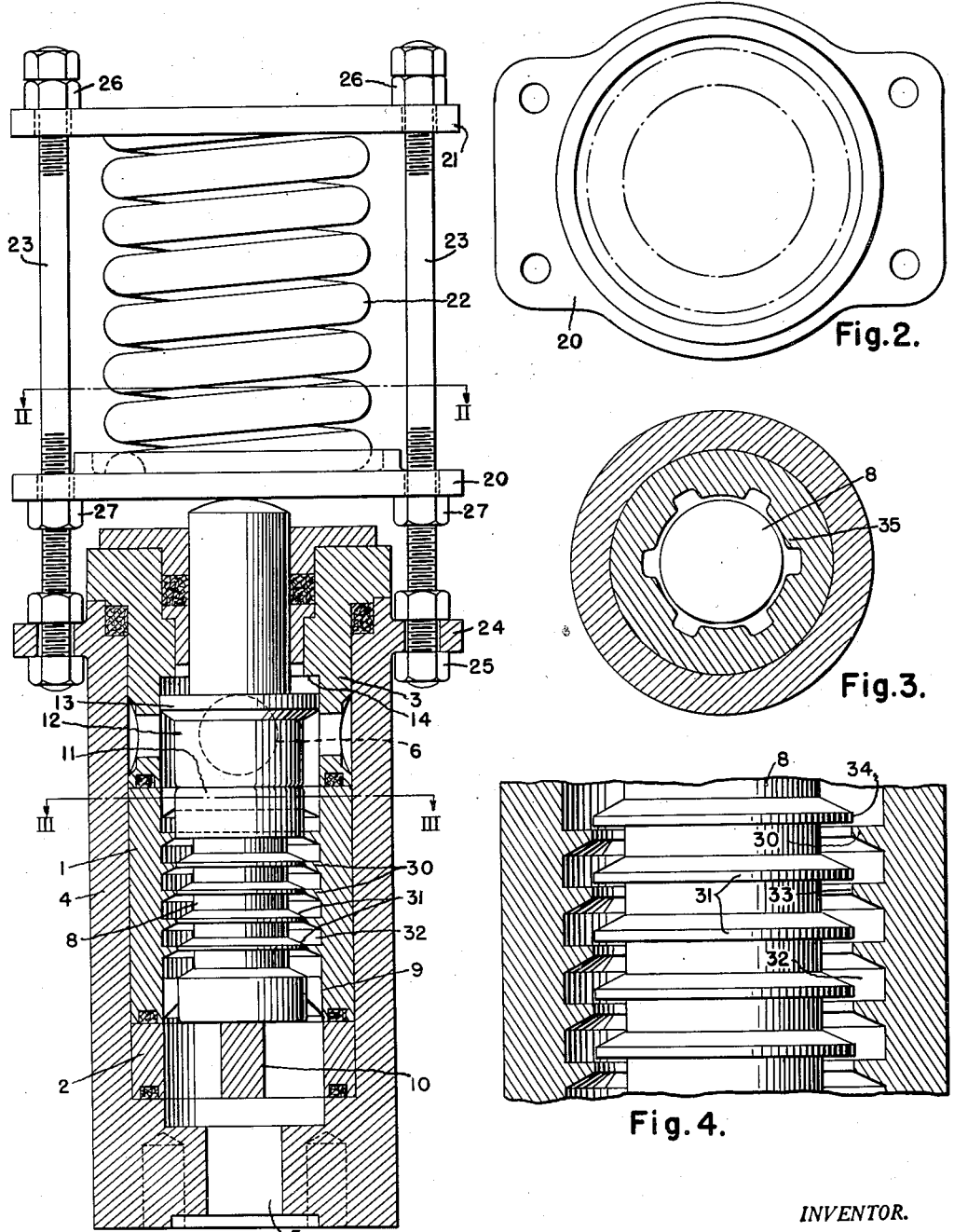

Oct. 9, 1951  F. C. BIGGERT, JR  2,571,007
RELIEF VALVE

Filed July 31, 1947  2 Sheets-Sheet 1

INVENTOR.
Florence C. Biggert, Jr.
BY
his ATTORNEY.

Oct. 9, 1951  F. C. BIGGERT, JR  2,571,007
RELIEF VALVE

Filed July 31, 1947  2 Sheets-Sheet 2

INVENTOR.
Florence C. Biggert, Jr.
BY J. E. Dickinson
his ATTORNEY

Patented Oct. 9, 1951

2,571,007

UNITED STATES PATENT OFFICE 2,571,007

RELIEF VALVE

Florence C. Biggert, Jr., Pittsburgh, Pa., assignor to United Engineering & Foundry Company, Pittsburgh, Pa., a corporation of Pennsylvania Application July 31, 1947, Serial No. 765,125

11 Claims. (Cl. 137—53)

This invention relates to fluid pressure relief valves such as those used in hydraulic systems for forging presses and the like, but in its broader aspects it is not limited to relief valves for this purpose.

The usual or conventional form of relief valves includes a conical valve head which is firmly held upon a conical seat by pressure applying mechanism, such as a spring or weight, whose action is so adjusted that the valve rises from its seat when the pressure acting on the inlet side of the valve exceeds a predetermined amount. Such valves are subject to several difficulties, among which is first, the pressure applying mechanism, whether it be a spring or weight, cannot be so set that the valve will continuously operate at predetermined desired pressure; second, the valve vibrates with resultant chattering and wear on its parts; and third, the valve parts erode rapidly.

As to the difficulty incident to setting the pressure applying mechanism, which is hereinafter referred to as a spring, the valve seat must be of such width from edge to edge to support the spring load. It is practically impossible to insure perfect contact between the valve and the seat over the entire area of contact, in view of which the customary practice is to assume that the hydraulic inlet pressure acts upon an area of the valve defined by the mean seat diameter, and to adjust the spring to resist the desired hydraulic pressure in pounds per square inch multiplied by that area, or in the alternative, to adjust the spring by actual test. However, due to wear which will presently be explained, in the operation of the valve the effective seat diameter changes from time to time with the result that the pressure at which the valve is unseated is variable and uncertain. To maintain a desired seating of the valve usually requires the spring being set at a pressure in excess of the desired hydraulic pressure so that the latter will be attained before the valve opens.

The second difficulty incident to the operation of the usual form of relief valves, namely vibration with resulting chattering and wear, is more serious. Of the several theories that have been advanced to explain this vibration, the most reasonable one appears to be that when the valve is closed an hydraulic pressure head is exerted upon an area of the valve that is greater than that of its smallest seat diameter, usually considered to be the mean seat diameter. When the valve rises a small distance from its seat, the pressure head on the area between the smallest seat diameter and the diameter at which the valve actually seats is instantly converted to a velocity head which reduces the pressure head load and causes the valve to close, whereupon the pressure head is again instantly restored with the result that the valve vibrates violently and destroys itself and its seat quite rapidly.

This difficulty may be reduced by making the valve so small that when it is discharging the maximum volume of liquid required for safety, the valve is lifted a substantial distance from its seat; or alternatively, by making the valve stem larger than the largest seat diameter and providing in the waist line a choke which discharges no more than the maximum volume at the desired pressure. These expedients are effective if the valve always discharges at or near the maximum volume of liquid, but when the volume to be discharged varies materially from time to time they are not effective. In other words, when only a small volume is discharged a small valve will open only a small distance and will vibrate, and likewise the choke will not maintain maximum pressure on the valve with the result that chattering takes place.

The third difficulty, namely that of erosion of both the valve and its seat, is due to the high velocity of hydraulic fluid that flows between them when the valve discharges, such velocity being a function of the pressure difference across the valve opening. For example, when a valve and its seat are in close proximity, high pressure water discharging between them erodes their faces in a comparatively short time. Even when these parts are made of hardened stainless steel, which is generally considered to be the best material obtainable for the purpose, the erosion is so rapid that when frequent relief action occurs the seats must be re-dressed within one to four weeks' service when the water pressure is 5,000 pounds per square inch. As a consequence of this and the other difficulties incident to the use of the usual form of relief valves, most of them cannot be maintained tight when closed, there usually being some leakage which causes continuing erosion so that in time the leakage becomes objectionably great and the valve must be re-dressed.

The object of this invention is to provide an hydraulic pressure relief valve that can readily be adjusted continuously and accurately to discharge at any desired pressure, which will not be subject to objectionable wear-producing vibration in service, and the parts of which will not be subject to objectionable erosion.

The relief valve provided according to this invention includes a casing, which is preferably of tubular form, having an inlet at or adjacent to one of its ends and an outlet at or adjacent to its other end. Between the inlet and outlet, the casing is provided interiorly with a series of transverse collars that are spaced from each other and are provided with aligned openings, the collars preferably being formed integrally with the casing and extending inwardly from its inner wall. Extending through the collar openings there is a movable piston or valve stem that is provided exteriorly with a series of collars or valves that are so spaced from each other that in the valve-closing position of the stem one of its valves registers with each of the openings in the collars within the casing. Preferably the openings in the collars and the peripheries of the valves are cylindrical, the peripheries of the valves being slightly less in diameter than the openings in the collar so that the valves do not seat upon the collar. The several collars and valves, together with the inside of the casing and the outside of the stem, form a series of pressure-relief chambers between the inlet and outlet of the casing, the general form of the collars and valves being such that in each of such chambers there is a substantial amount of turbulence in the flow of discharge fluid. The net result is that the pressure head at the inlet is lowered in successive stages by the labyrinth arrangement of collars, valves, and relief chambers with consequent incremental reduction in the pressure head, and consequently the velocity, of the discharged fluid as it flows from chamber to chamber.

Figure 5:
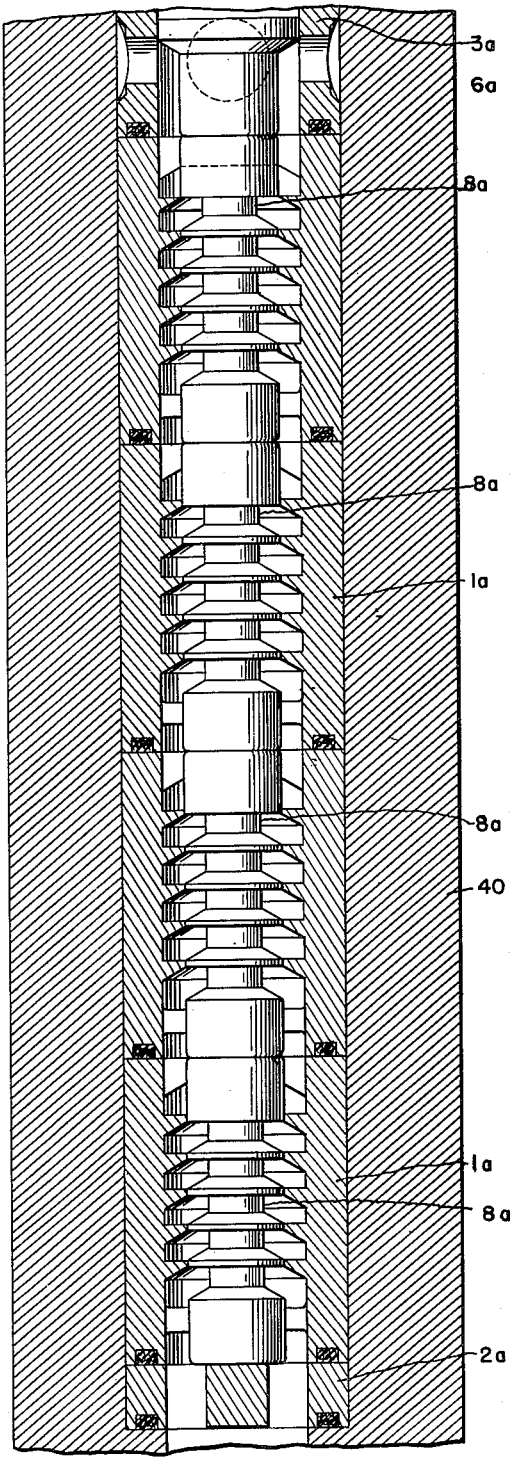

The invention is illustrated in the accompanying drawings in its applicability to an hydraulic relief valve, although in its broader aspects it is applicable to relief valves for gaseous and like fluids. Fig. 1 is a somewhat diagrammatic vertical sectional view of a single-unit relief valve in closed position; Figs. 2 and 3 horizontal sectional views taken on the lines II—II and III—III, respectively, of Fig. 1; Fig. 4 a view similar to a portion of Fig. 1 showing the relative position of the valve part when the relief valve is in its initial open position; Fig. 5 a view similar to Fig. 1 of a multiple-unit relief valve; and Fig. 6 a view similar to Fig. 1 of a single-unit relief valve showing a modification of construction.

In the embodiment of the invention illustrated in Figs. 1 to 4, a valve casing of tubular form having a main body 1, an inlet ring 2, and an outlet section 3, is separably mounted in a housing 4 which is provided with an inlet 5 adapted to be connected to a fluid pressure line or system, and is provided with an outlet 6 adapted to be connected to a discharge line. Within the casing there is an axially movable piston or valve stem 8 whose lower end or head 9 is of such length that in the closed position of the relief valve it rests upon a fixed or adjustable stop 10 which, as shown in Fig. 1, may consist of a bar that extends diametrically across inlet ring 2 and is formed integrally therewith. At the upper end or head 11 of valve stem 8 there is seated a valve stem extension 12 that has a peripheral flange 13 whose upper face is adapted to engage a shoulder 14 formed within outlet section 3 of the casing. This shoulder limits the fully open position of the relief valve so that it will not choke by traveling too far. The upper portion of extension 12 projects through a suitable packing within the outlet section 3 of the casing, and is engaged at its top by mechanism for loading the relief valve as desired.

Various forms of adjustable weight or spring pressure-applying instrumentalities may be used. The form illustrated includes a lower plate 20 that bears upon the upper end of stem extension 12, an upper plate 21, a compression spring 22 between these plates, and two pairs of pressure adjusting bolts 23 that extend loosely through the end portions of plates 20 and 21 and also through flanges 24 that are secured to housing 4. The lower end of each bolt 23 is anchored in flange 24 by a nut 25, its upper end is engaged by a pressure adjusting nut 26, and below plate 20 each bolt 23 is engaged by a nut 27 that may be adjusted on the bolt to fix the valve stem in desired closed-valve position. By tightening or loosening nuts 26 on bolts 23, the compression of spring 22 may be increased or diminished to vary the load on the valve stem according to the service requirements of the relief valve.

Having reference now to the illustrative construction of the valve casing and stem for controlling the flow of discharge fluid, which may be water, casing 1 is integrally provided interiorly with a series of equally spaced collars 30, and stem 8 is integrally provided exteriorly with a series of like collars or valves 31 that are spaced from each other the same distance as collars 30. These collars and valves form a series of annular pressure relief chambers 32, and are so shaped that there is a substantial amount of turbulence in the flow of discharge water through the chambers. To effect such turbulence, the lower faces of collars 30 and the upper faces of valves 31 are shown as inclined about 30° to the longitudinal axis of the relief valve, and the upper faces of the collars and the lower faces of the valves are shown as lying in planes at right angles to such axis, although to cause maximum turbulence in the flow of water through chambers 32 the collars and valves may be shaped differently than shown.

Each collar is provided with a narrow cylindrical land 33, and each valve with a similar cooperating land 34. So that the valves may move freely within the collars instead of seating upon them, the diameter of each valve land is slightly less than that of the land on its cooperating collar. For maintaining the valve stem 8 centrally within casing 1 when the relief valve is open for the discharge of water, the end portions of the casing are provided with a plurality of guide fingers 35 (Figs. 1 and 3) which are of such length axially of the valve stem that they engage its heads 9 and 11 throughout the full range of open positions of the valve stem.

In Fig. 1 the valve stem 8 is shown in the fully closed position of the relief valve with the lands 34 on valves 31 fully overlapping the lands 33 on collars 30. However, in such closed position there need be only a partial overlap of these lands. In the operation of the valve there is, due to the clearance between the collar lands 33 and the valve lands 34, a leakage discharge of water through the relief valve when it is in closed position, which discharge keeps all of the pressure relief chambers 32 filled with water. However, this discharge is small, and is negligible for many purposes where continuous dependability of relief valves is important, such as in hydraulic forging operations where water is supplied by direct pumping. By way of example, it has been found that in a relief valve constructed as shown in Fig. 1 in which the diameter of each of the five valve lands was approximately 1½ inches and the radial clearance between the lands about .001 of an inch, the discharge of water at all inlet pressures up to about 1,000 pounds per square inch was not over 2 gallons per minute.

When the inlet pressure acting upon the bottom of lower valve stem head 9 exceeds the spring load applied to the upper end of the stem, the stem moves upwardly. If in the closed position of the valve the lands 33 and 34 are completely overlapped as shown in Fig. 1, there is no perceptible increase in the discharge of water until the lower edges of valves 31 rise slightly above the upper edges of collars 30, which initial open position of the relief valve is shown in Fig. 4. Water then flows turbulently through each of the series of annular chamber 32, the several cooperating collars and valves forming a series of discharge orifices. It has been found that if a valve like that shown in Fig. 1 is set to relieve a maximum pressure of 1,000 pounds per square inch the drop in pressure of the water across each of the five cooperating collars and valves is about 200 pounds per square inch. This is materially below the pressure drop that results in erosion of the valve heads and seats of the conventional form of relief valves when such parts are made of suitable erosion-resisting materials. The drop in pressure head of fluid as it flows through the valve is due to the combined action within the orifices and the chambers. Across each orifice, that is, from its entry chamber to its discharge chamber, the fluid must acquire a velocity which can be obtained only by a difference in pressure within the chambers, the entry pressure being the higher. This velocity entering the discharge chamber is dissipated by turbulence within the chamber, and since the discharge chamber of each orifice becomes the entry chamber of the next succeeding orifice and since for relatively incompressible liquids such as water the velocities through each orifice must be the same, it follows that across each orifice the pressure difference will be the same and will be equal, within practical tolerance, to the total pressure difference between the inlet pressure and outlet pressure divided by the number of orifices. By increasing the number of cooperating collars and valves, as for example in the manner presently to be explained with reference to Fig. 5, the same low orifice velocity can be maintained in a relief for any desired maximum pressure.

In addition to overcoming the erosion difficulty incident to the use of conventional relief valves, the valve provided according to this invention is not subject to the vibration and consequent chattering that characterizes the use of conventional valves. When the valve herein provided is discharging, the static hydraulic pressure acting oppositely on the adjacent faces of valves 31 in each chamber 32 is balanced, but, although normally low, the velocity of the water flowing from chamber to chamber sets up dynamic forces that increase the pressure on the lower faces of each valve 31. This increases the axial force tending to raise the valve stem, and accordingly overcomes the generally accepted cause of vibration and chattering in the use of commercial relief valves explained above.

Because the cooperating collars and valves of the relief valve herein provided are not subject to wear by erosion or chattering, the pressure applying mechanism may readily be set to cause the valve dependably and continuously to discharge at any desired pressure. This overcomes the other of the three difficulties explained above incident to the operation of conventional relief valves.

Having reference now to the multiple-relief valve shown in Fig. 5, it consists of several units of the relief valve shown in Fig. 1, and illustrates how the relief valve herein provided may be enlarged for use in installations where it is desired to relieve high unit pressures without increasing the pressure drop between successive pressure relief chambers. The Fig. 5 valve consists of a single housing 40 containing four separable main body casing sections 1a, a single inlet ring 2a, an outlet section 3a, and four valve stem sections 8a, all arranged end to end as shown. Otherwise the construction of the Fig. 5 relief valve may be the same as that of Fig. 1, as is indicated by the use of the same numerals in Fig. 5 for the parts that are the same as in Fig. 1. By thus making the casing and valve stem units or sections, each may be more accurately machined and otherwise manufactured than if they were formed integrally, and binding of the stem within the casing is avoided. The operation of the relief valve of Fig. 5 is the same as that of Fig. 1.

The form of relief valve shown in Figs. 1 and 5 is particularly applicable to hydraulic systems in which constant volume discharge pumps act directly upon hydraulic presses without the intervention of hydraulic accumulators. In a press system of this type, the water pressure is generated only when a resistance to the motion of a press head is encountered, and only in such amount as required to overcome the resistance. In many operations, as for instance in the forging of metals by hydraulic presses, the duration of the pressing is only a small part of the entire operating time in each cycle, and frequently the pressure required is but a fraction of the available maximum. For such conditions, the form of relief valves shown in Figs. 1 and 5 has, in addition to the advantages already explained, the further advantage that as the resistance of a press exceeds a predetermined pressure, near maximum, the relief valve gradually increases its discharge until at maximum pressure the entire pump discharge passes through the valve and motion of the press head ceases while full pressure is maintained until the operator causes the press head to rise.

Figure 6:
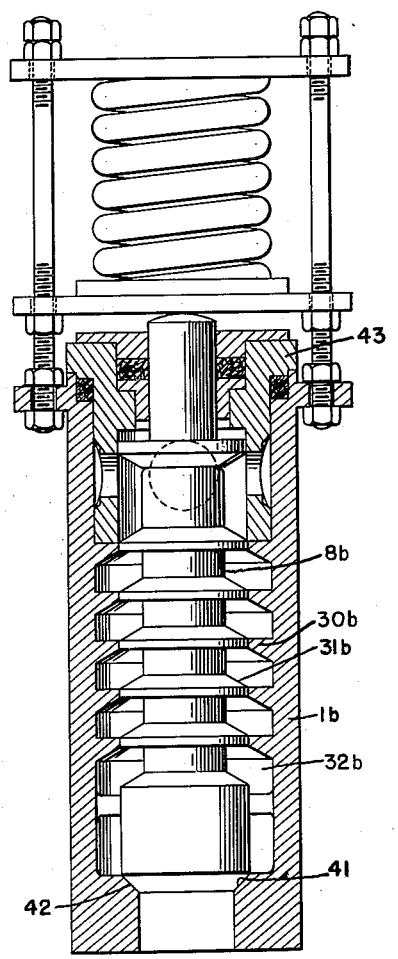

In the modification shown in Fig. 6, the valve casing 1b is formed integrally throughout, except for an end closure 43, and the valve casing is not mounted in a housing as in the valves of Figs. 1 and 5. Also, provision is made for eliminating leakage through the relief valve when it is in closed position. For that purpose, valve stem 8b is provided at its lower end with a conical valve head 41 which bears on a conical seat 42 formed within casing 1b, this being similar to conventional plug-type relief valves. Otherwise, the Fig. 6 form of relief valve may be the same as that shown in Fig. 1.

By so constructing the valve of Fig. 6 that the maximum diameter of its inlet head is not greater than the diameter of collars 31b or valves of stem 8b, the axial inlet pressure on the valve stem will not decrease upon the initial opening of the valve and result in the chattering as explained above with reference to the conventional form of relief valves. On the contrary, the axial inlet pressure in the valve of Fig. 6 will increase due to the flow or velocity pressure on the several valves 31b. Hence, the valve stem does not vibrate, and it is subject to little, if any, erosion of its seat parts 41 and 42 because the valve stem quickly rises sufficiently to reduce the velocity of flow across the seat, and also because the pressured drop across the seat parts is materially reduced by the above-explained action of the several cooperating collars 30b and valves 31b and the turbulent flow in chambers 32b.

The Fig. 6 relief valve has all of the advantages of that of Fig. 1, except that, because of the substitution in the Fig. 6 valve of a closed seat at its inlet end in place of the end stop 10 in the Fig. 1 valve, the spring loading pressure of the Fig. 6 valve cannot be set so exactly. But, as has been stated, the Fig. 6 valve has the additional advantage that there is little or no discharge leakage through it when in closed position.

According to the provisions of the patent statute, I have explained the principle and mode of operation of my invention, and have illustrated and described what I now consider to be its best embodiments. However, I desire to have it understood that, within the scope of the appended claims, the invention may be practiced otherwise than as specifically illustrated and described.

I claim:

1. An hydraulic pressure relief valve comprising a housing having an inlet and an outlet at the opposite ends thereof a separable casing within said housing having an inlet and an outlet and provided interiorly between the inlet and outlet with a series of transverse collars that are spaced from each other and are provided with aligned openings, a movable valve stem extending through said openings and provided with a series of valves so spaced from each other that in valve-closing position of said stem one valve registers with each of said collar openings and establishes a limited clearance between said valves and said collars, said casing, collars and valves forming a series of pressure-relief chambers between the inlet and outlet of the casing, and pressure-applying mechanism acting on said stem to urge it towards valve-closing position against hydraulic inlet pressure.

2. An hydraulic pressure relief valve comprising a housing having an inlet and an outlet at the opposite ends thereof a separable casing within said housing having an inlet and an outlet and provided interiorly between the inlet and outlet with a series of transverse collars that are spaced from each other and are provided with aligned cylindrical openings, a movable valve stem extending through said openings and provided with a series of valves having cylindrical peripheries slightly less in diameter than said collar openings and so spaced from each other that in valve-closing position of said stem one valve registers with each of said collar openings and establishes a limited clearance between said valves and said collars, said casing, collars and valves forming a series of pressure-relief chambers between the inlet and outlet of the casing, and adjustable pressure-applying mechanism acting on said stem to urge it towards valve-closing position against hydraulic inlet pressure.

3. An hydraulic pressure relief valve comprising a housing having an inlet and an outlet at the opposite ends thereof a separable casing within said housing having an inlet and an outlet and provided interiorly between the inlet and outlet with a series of transverse collars that are spaced from each other and are provided with aligned cylindrical openings, a movable valve stem extending through said openings and provided with a series of valves so spaced from each other that in valve-closing position of said stem one valve registers with each of said openings and establishes a limited clearance between said valves and said collars, guide members within the casing formed to position said stem and to permit flow axially thereof, said casing, collars and valves forming a series of pressure-relief chambers between the inlet and outlet of the casing, and pressure-applying mechanism acting on said stem to urge it towards valve-closing position against hydraulic inlet pressure within the casing.

4. An hydraulic pressure relief valve comprising a casing having an inlet and an outlet and provided interiorly between the inlet and outlet with a series of transverse collars that are spaced from each other and are provided with aligned cylindrical openings, a movable valve stem extending through said openings and provided with a series of valves having cylindrical peripheries slightly less in diameter than said collar openings and so spaced from each other that in valve-closing position of said stem one valve registers with each of said collar openings and establishes a limited clearance between said valves and said collars, said casing, collars and valves forming a series of pressure-relief chambers between the inlet and outlet of the casing, pressure-applying mechanism acting on said stem exteriorly of the casing to urge it towards valve-closing position against hydraulic inlet pressure within the casing, and a stop within the casing formed to engage said stem and thereby limit its valve closing movement.

5. An hydraulic pressure relief valve comprising a housing having an inlet and an outlet at its opposite ends, a separable casing within the housing formed of a plurality of tubular units arranged end to end and each provided interiorly with a series of transverse collars that are spaced from each other and are provided with aligned cylindrical openings, a movable valve stem formed of a plurality of units arranged end to end and each extending through said openings in one of said casing units, each stem unit being provided with a series of valves having cylindrical peripheries slightly less in diameter than said collar openings of the casing unit and so spaced from each other that in valve-closing position of the stem one valve registers with each of said collar openings and establishes a limited clearance between said valves and said collars, said casing, collars and valves forming a series of pressure-relief chambers between the inlet and outlet of the casing, and adjustable pressure-applying mechanism acting on said stem to urge it towards valve-closing position against hydraulic inlet pressure.

6. An hydraulic pressure relief valve comprising a housing having an inlet and an outlet at its opposite ends, a separable casing within the housing formed of a plurality of tubular units arranged end to end and each provided interiorly with a series of transverse collars that are spaced from each other and are provided with aligned cylindrical openings, a movable valve stem formed of a plurality of units arranged end to end and each extending through said openings in one of said casing units, each stem unit being provided with a series of valves having cylindrical peripheries slightly less in diameter than said collar openings of the casing unit and so spaced from each other that in valve-closing position of the stem one valve registers with each of said collar openings and establishes a limited clearance between said valves and said collars, said casing, collars and valves forming a series of pressure-relief chambers between the inlet and outlet of the casing, adjustable pressure-applying mechanism acting on said steam to urge it towards valve-closing position against hydraulic inlet pressure, and a stop within the casing formed to limit the valve-closing movement of said stem.

7. An hydraulic pressure relief valve comprising a housing having an inlet and an outlet at its opposite ends, a separable casing within the housing formed of a plurality of tubular units arranged end to end and each provided interiorly with a series of transverse collars that are spaced from each other and are provided with aligned cylindrical openings, a movable valve stem formed of a plurality of units arranged end to end and each extending through said openings in one of said casing units, each stem unit being provided with a series of valves having cylindrical peripheries slightly less in diameter than said collar openings of the casing unit and so spaced from each other that in valve-closing position of the stem one valve registers with each of said collar openings and establishes a limited clearance between said valves and said collars, guides within each casing unit formed to position said stem units centrally therein and to permit flow axially of the stem, said casing, collars and valves forming a series of pressure-relief chambers between the inlet and outlet of the casing, and adjustable pressure-applying mechanism acting on said stem to urge it towards valve-closing position against hydraulic inlet pressure.

8. An hydraulic pressure relief valve comprising a housing having an inlet and an outlet at the opposite ends thereof a separable casing within said housing having an inlet and an outlet and provided interiorly between the inlet and outlet with a series of transverse collars that are spaced from each other and extend inwardly of the casing and are provided with aligned cylindrical openings, a movable valve stem extending through said openings and provided with a series of outwardly extending valves having cylindrical peripheries slightly less in diameter than said collar openings and so spaced from each other that in valve-closing position of said stem one valve registers with each of said collar openings and establishes a limited clearance between said valves and said collars, said casing, collars and valves forming between the inlet and outlet of the casing a series of annular pressure relief chambers shaped to cause turbulence in the flow of liquid through the casing, and adjustable pressure-applying mechanism acting on said stem to urge it towards valve-closing position against hydraulic inlet pressure.

9. An hydraulic pressure relief valve comprising a casing having an inlet and an outlet and provided interiorly between the inlet and outlet with a series of transverse collars that are spaced from each other and are provided with aligned openings, a movable valve stem extending through said openings and provided with a series of valves so spaced from each other that in valve-closing position of said valve stem one valve registers with each of said collar openings and establishes a limited clearance between said valves and said collars, guides within the casing formed to position said stem centrally therein, said casing, partitions and valves forming a series of pressure-relief chambers between the inlet and outlet of the casing, a valve stem stopping member within the casing formed to engage one end of said stem when in valve-closing position, the other end of the stem projecting exteriorly of the casing, and an adjustable spring acting on said projecting end of the stem to urge it towards valve-closing position against hydraulic inlet pressure.

10. An hydraulic pressure relief valve comprising a casing having an inlet and an outlet and provided interiorly between the inlet and outlet with a series of transverse collars that are spaced from each other and are provided with aligned openings, a movable valve stem extending through said openings and provided with a series of valves so spaced from each other that in valve-closing position of said stem one valve registers with each of said collar openings and establishes a limited clearance between said valves and said collars said casing, collars and valves forming a series of pressure-relief chambers between the inlet and outlet of the casing, said casing being provided with stops formed to limit the travel of said stem, and pressure-applying mechanism acting on said stem to urge it towards valve-closing position against hydraulic inlet pressure.

11. An hydraulic pressure relief valve comprising a casing having an inlet and an outlet and provided interiorly between the inlet and outlet with a series of transverse collars that are spaced from each other and are provided with aligned openings, a movable valve stem extending through said openings and provided with a series of valves so spaced from each other that in valve-closing position of said stem one valve registers with each of said collar openings and establishes a limited clearance between said valves and said collars, said casing, collars and valves forming a series of pressure-relief chambers between the inlet and outlet of the casing, said casing and the lower end of said stem being provided with cooperating valve seats formed to prevent flow through the valve in the closed position thereof and said casing being provided with a stop formed to limit the open-valve position of said stem, and pressure-applying mechanism acting on said stem to urge it towards valve-closing position against hydraulic inlet pressure.

FLORENCE C. BIGGERT, JR.

REFERENCES CITED

The following references are of record in the file of this patent:

UNITED STATES PATENTS

| Number | Name | Date |
| --- | --- | --- |
| 801,514 | Dexter | Oct. 10, 1905 |
| 1,766,648 | Keller | June 24, 1930 |
| 1,919,232 | Lee | July 25, 1933 |
| 1,919,233 | Lee | July 25, 1933 |
| 1,952,816 | Mock | Mar. 27, 1934 |